US007119301B2

(12) United States Patent
Langley

(10) Patent No.: US 7,119,301 B2
(45) Date of Patent: Oct. 10, 2006

(54) DEVICE FOR ISOLATING A SURFACE FOR WELDING

(75) Inventor: Clive Graham Langley, Western Australia (AU)

(73) Assignee: Neptune Marine Services Limited, Western Australia (AU)

( * ) Notice: Subject to any disclaimer, the term of this patent is extended or adjusted under 35 U.S.C. 154(b) by 268 days.

(21) Appl. No.: 10/399,121

(22) PCT Filed: May 2, 2001

(86) PCT No.: PCT/AU01/00495

§ 371 (c)(1),
(2), (4) Date: Jun. 16, 2003

(87) PCT Pub. No.: WO01/83147

PCT Pub. Date: Nov. 8, 2001

(65) Prior Publication Data
US 2004/0062532 A1 Apr. 1, 2004

(30) Foreign Application Priority Data
May 2, 2000 (AU) .................................. PQ7237

(51) Int. Cl.
B23K 9/32 (2006.01)
(52) U.S. Cl. ........................................ 219/72; 219/136
(58) Field of Classification Search ................ 219/72, 219/74, 75, 136
See application file for complete search history.

(56) References Cited
U.S. PATENT DOCUMENTS
1,716,614 A * 6/1929 Bergman 4,039,798 A * 8/1977 Lythall et al.
4,654,500 A * 3/1987 Stiles et al.
4,956,537 A 9/1990 Schnorrer
5,750,954 A 5/1998 White et al.
5,852,271 A 12/1998 Offer

FOREIGN PATENT DOCUMENTS
JP 53-15242 A * 2/1978
JP 55-14125 A * 1/1980

OTHER PUBLICATIONS
Derwent Publications, p. 55, PAN 92/396102/48 NL 9100586A—KEMA, 1992.

* cited by examiner

Primary Examiner—Clifford C. Shaw
(74) Attorney, Agent, or Firm—Duane Morris LLP

(57) ABSTRACT

A device (10) for isolating a surface for welding in an underwater location or in high fire risk areas. The device comprises a housing (27) which is arranged to be mounted on the surface and a sealing means (30) to provide a seal between the housing and the surface. The housing (27) is provided with a sealed inlet (50) for receiving a welding apparatus, a fluid inlet (32) for the passage of gas into the housing, and a fluid outlet (34) for the passage of gas and/or liquid out of the housing. A heating means FIG. 3 is not figure) for providing heated gas to the fluid inlet is also provided. In use, an ingress of heated gas through the fluid inlet (32) facilitates an egress of gas and/or liquid, contained in a space defined by the housing and the surface, through the fluid outlet (34) in the housing. In this way an in situ dry gaseous environment is provided for welding the surface. The heating means (100) is provided upstream and comprises a space with heating elements (120) surrounded by insulation (130) with electrical inlets (122).

28 Claims, 2 Drawing Sheets

DEVICE FOR ISOLATING A SURFACE FOR WELDING

FIELD OF THE INVENTION

The present invention relates to a device for isolating a surface for welding, particularly, for example, in an underwater location or in a high fire risk area.

BACKGROUND OF THE INVENTION

The mechanical properties of a welded surface formed under "dry" welding conditions is frequently recorded to be greater than or equal to 23% elongation of tensile allweld. This stands in marked contrast to the mechanical properties of a welded surface which is formed under "wet" welding conditions. The elongation of tensile allweld for an underwater welded surface is typically about 7–8% due to rapid cooling of the welded surface through heat dispersion to the surrounding water and a high concentration of hydrogen absorbed into the weld. The underwater welded surface is thus more brittle and weaker than a weld formed on a surface made of the same material under "dry" conditions.

It is known to provide large hyperbaric chambers which are constructed around, so as to fully enclose, an underwater surface which requires welding. Such hyperbaric chambers are large enough to hold a diver and the diver's welding apparatus. In use, the hyperbaric chamber is drained of water and the diver welds the surface under "dry" conditions. The procedure is lengthy, and costly. The hyperbaric chambers are large and cumbersome to operate, and they are frequently oversized for the surface area which requires welding. Not surprisingly, the hyperbaric chambers are very expensive. For a very small welded area, the cost can run into many millions of dollars.

The present invention seeks to overcome at least some of the aforementioned disadvantages.

SUMMARY OF THE INVENTION

In accordance with a first aspect of the invention there is provided a device for isolating a surface for welding, comprising a housing provided with a sealed inlet for receiving a welding apparatus, a fluid inlet for the passage of gas into the housing, and a fluid outlet for the passage of gas and/or liquid out of the housing, wherein the housing is arranged in use to be mounted on the surface, and a sealing means disposed between the housing and the surface to provide a seal between the housing and the surface, whereby, in use, an ingress of gas through the fluid inlet in the housing facilitates an egress of gas and/or liquid, contained in a space defined by the housing and the surface, through the fluid outlet in the housing, thereby providing an in situ gaseous environment for welding the surface.

In accordance with a second aspect of the invention there is provided a device for isolating a surface for welding, comprising a housing provided with a sealed inlet for receiving a welding apparatus, a fluid inlet for the passage of gas into the housing, and a fluid outlet for the passage of gas and/or liquid out of the housing, wherein the housing is arranged in use to be mounted on the surface, a sealing means disposed between the housing and the surface to provide a seal between the housing and the surface, and a heating means adapted to provide heated gas to the fluid inlet of the housing wherein, in use, an ingress of heated gas through the fluid inlet in the housing facilitates an egress of gas and/or liquid, contained in a space defined by the housing and the surface, through the fluid outlet in the housing, thereby providing an in situ dry gaseous environment for welding the surface.

DETAILED DESCRIPTION OF AN EMBODIMENT OF THE INVENTION

The present invention will now be described, by way of example only, with reference to the accompanying drawings, in which.

Figure 1:
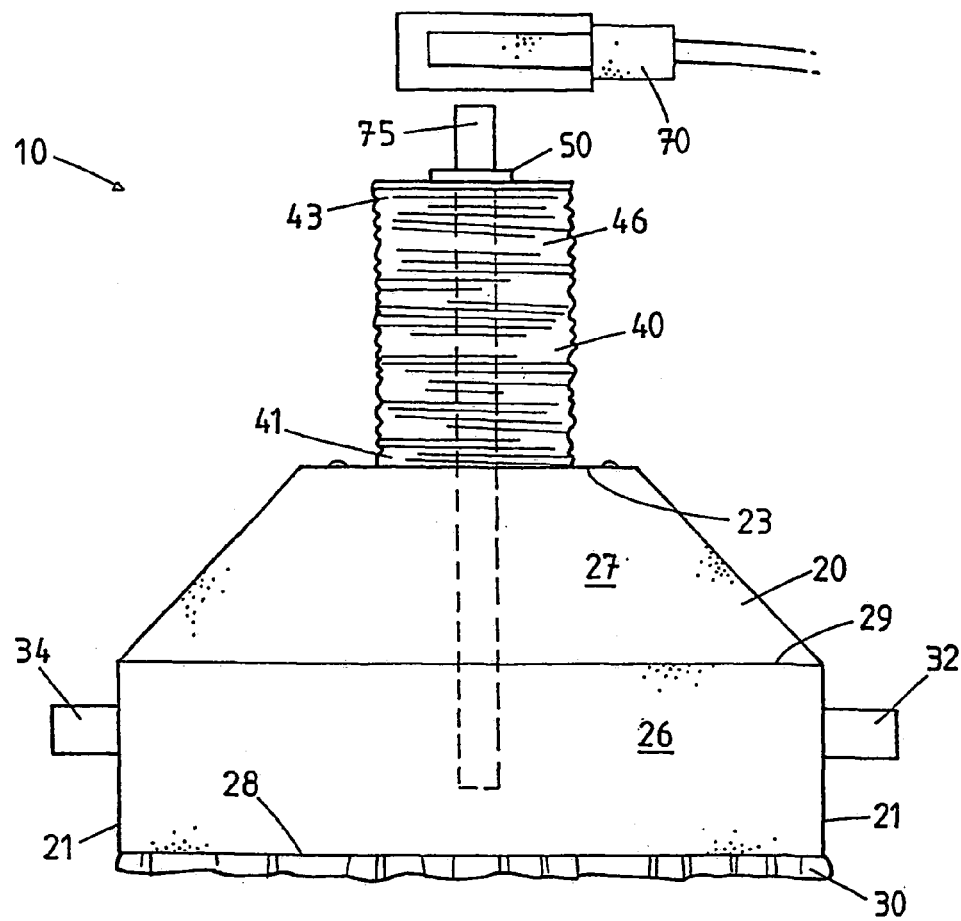
FIG. 1 is a side elevatory view of a device for isolating an underwater surface from surrounding water in accordance with the present invention.
Figure 2:
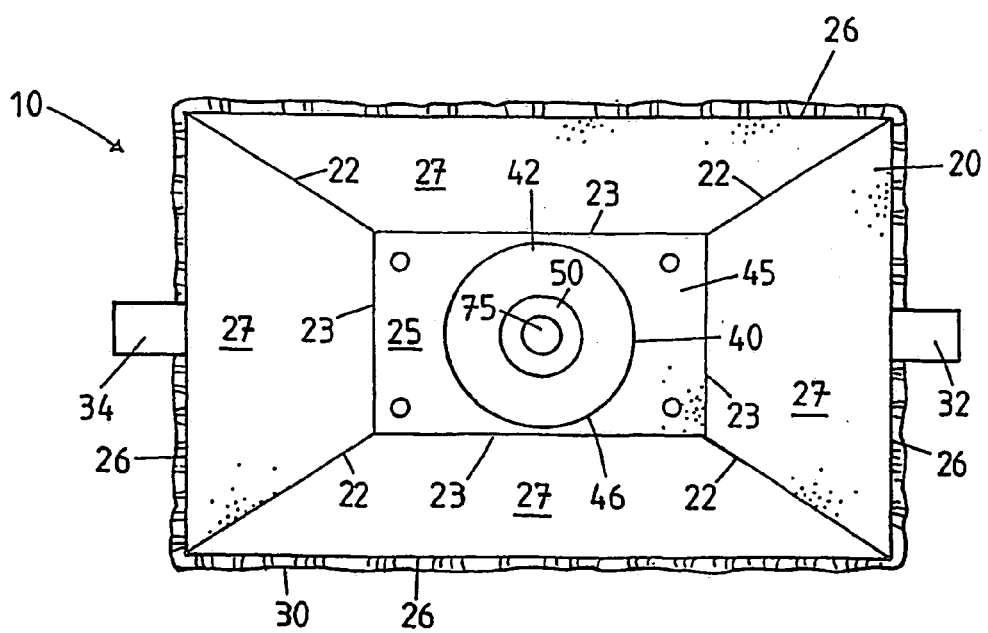
FIG. 2 is a plan view of the device shown in FIG. 1.

In FIGS. 1 and 2 of the accompanying drawings there is shown a device 10 for isolating an underwater surface from surrounding water for welding. The device 10 includes a housing 20, a first seal 30, a flexible member 40, and a second seal 50. The housing 20 is comprised of a plurality of upright side walls 26, a plurality of corresponding inwardly inclined upper walls 27, each upper wall 27 depending from an uppermost edge 29 of each side wall 26, and a substantially horizontal uppermost wall 25 laterally extending between uppermost edges 23 of the upper walls 27. Each side wall 26 is interconnected to an adjacent side wall 26 along the length of its side edge 21. Similarly, each upper wall 27 is interconnected to an adjacent upper wall 27 along the length of its side edge 22. The uppermost wall 25 is provided with an aperture 42 disposed in a substantially central portion of the uppermost wall 25. Thus, the housing 20 forms an open ended box-like structure.

Preferably, the housing 20 is formed from a transparent rigid plastic material, for example perspex, or constructed from stainless steel with polycarbonate viewing windows, or any other material having characteristics for welding at depth. It is envisaged that the length and/or breadth of the housing will vary from about 250–300 mm to allow a weld runout length (ROL) of approximately 100–175 mm, however it is within the scope of the invention for the housing to have an increased size in proportion with the area of the surface to be welded.

Figure 3:
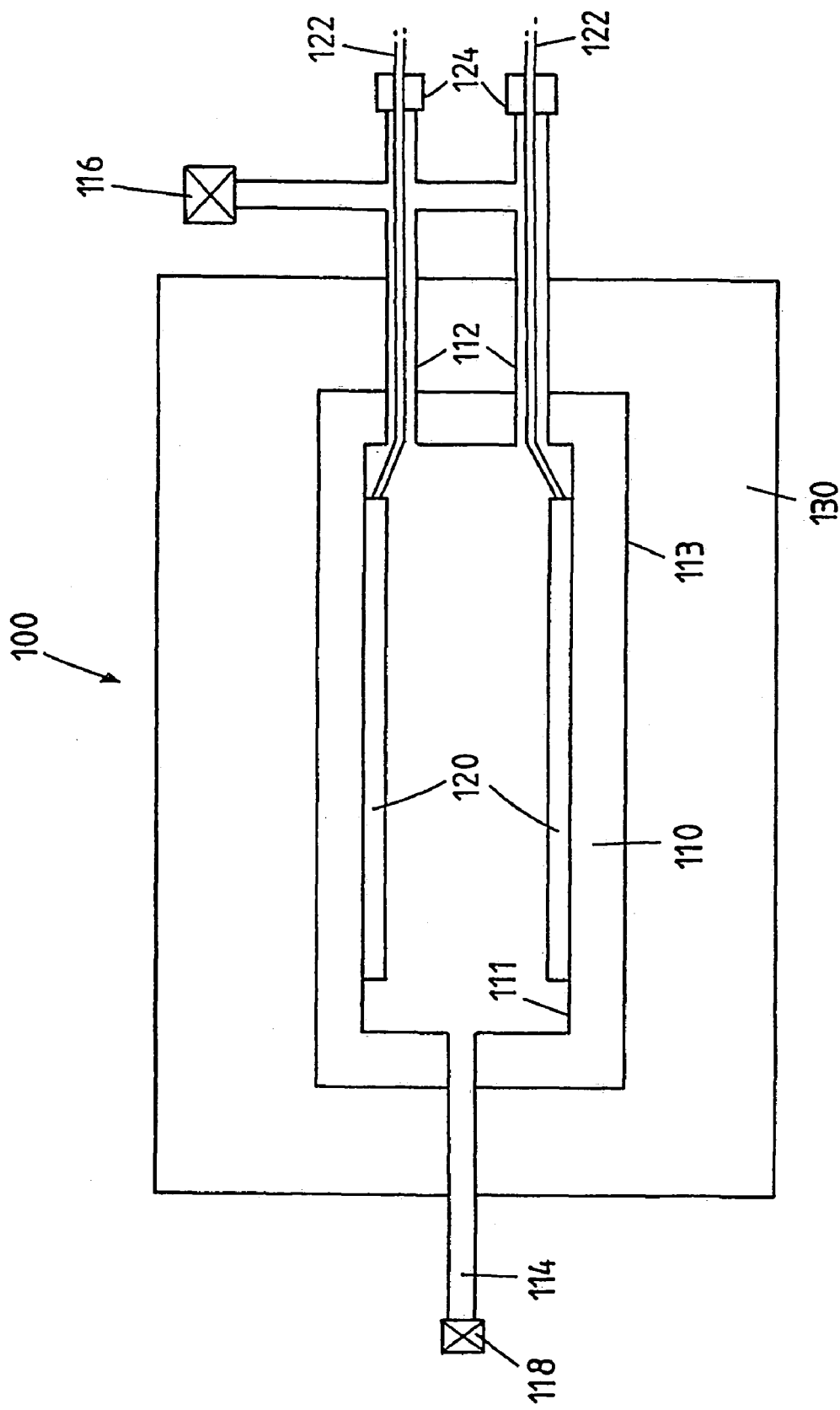
FIG. 3 is a diagrammatic sectional view of a gas heating means for use with the device shown in FIGS. 1 and 2.

The housing 20 is provided with a fluid inlet 32 and a fluid outlet 34 disposed in opposing side walls 26. The fluid inlet 32 is adapted to be coupled with, and in fluid communication with, a gas heating means 100 as shown in FIG. 3. The fluid inlet 32 extends into the housing 20, wherein a portion of the fluid inlet 32 disposed inside the housing 20 is perforated, forked, or branched to allow consistent and directional flow of gas into the housing 20. It is also envisaged that there may be a plurality of fluid inlets 32 disposed in any wall of the housing 20.

The first seal 30 depends from, and along the whole extent of, a lowermost edge 28 of the side walls 26. Preferably, the first seal 30 is made from a resilient plastics material, for example, neoprene or silicone, such that the seal formed between the housing 20 and the surface is water-tight. It is envisaged that the lowermost edge 28 of the side walls 26 will be provided with a contour to correspond with an exterior contour of the surface to be welded. For example, the contour of the lowermost edge 28 of the side walls 26 may be curved to correspond with the exterior contour of a welded pipe, or the contour of the lowermost edge 28 of the side walls 26 may be stepped to correspond with the exterior contour of a stepped surface.

The flexible member 40 is comprised of a flexible tube portion 46 having a first end 41 and a second end 43. The first end 41 is provided with a flange portion 45. The flange portion 45 is arranged, in use, to be mounted contiguously to the uppermost wall 25 of the housing 20. In this way, the tube portion 42 is substantially longitudinally aligned with the aperture 42 in the uppermost wall 25.

The second end 43 of the tube portion 42 is sealed. The second seal 50 is disposed in the second end 43 of the tube portion 42. The second seal 50 is arranged in use to receive a welding apparatus, for example a welding electrode 75 as shown in FIG. 1. Preferably the second seal 50 is made from a resilient plastics material, for example, neoprene or silicone rubber, such that the seal formed between the electrode 70 and the second seal 50 is water-tight.

Referring to FIG. 3, the gas heating means 100 includes a hollow heating vessel 110 having at least one gas inlet 112, a gas outlet 114, and at least one heating element 120. Preferably, the or each heating element 120 fixedly mounted on an inner surface 111 of the hollow heating vessel 110. Alternatively, the or each heating element 120 is disposed substantially orthogonally in a series, to the direction of gas flow into the heating vessel 110 such that heat transfer to inflowing gas is maximised. It is envisaged that the or each heating element 120 will heat an interior of the hollow heating vessel up to and around 700° C. It will be understood that the number and size of heating elements 120 disposed inside the heating vessel 110 will increase in proportion to the size of the heating vessel 110.

The hollow heating vessel 110 is formed from a rigid material which can withstand the degree of water pressure occurring at a depth where underwater welding is undertaken, and, preferably, which is also an efficient heat conductor. Preferably, the hollow heating vessel 110 is formed from a metallic material such as stainless steel, carbon steel, aluminum, titanium, and other suitable metallic alloys.

The hollow heating vessel 110 is provided with an insulation layer 130, disposed contiguously on an outer surface 113 of the hollow heating vessel 110, to prevent heat dispersion from the hollow heating vessel 110 to the surrounding water. Preferably, the insulation layer 130 is formed from a synthetic plastics material, such as rubber, polyethylene, polyurethane, or any other suitable insulating material.

The or each heating element 120 is provided with a conduit 122 for the supply of power to the or each respective heating element 120 from an outside power source (not shown). It is envisaged that a portion of the conduit 122 is disposed in a bore of the gas inlet 112, the gas inlet 112 being provided with a water-tight seal 124 where the conduit 122 enters the gas inlet 112.

The gas inlet 112 is provided with a first valve 116, the first valve 116 being adapted to be coupled to a welding gas source (not shown), such as a gas bottle, so as to receive gas from the welding gas source. It is envisaged that the gas will be supplied to the gas inlet 112 and, subsequently, the hollow heating vessel 110 at a pressure corresponding to a gas pressure regulated by a gas pressure regulator located at the welding gas source, typically at a flow rate of 30–40 litres/minute.

Typically, the temperature of the welding gas supplied to the gas inlet 112 and subsequently to the hollow heating vessel 110 is 0–25° C. The temperature of the welding gas is heated to 100–300° C., preferably 130–150° C. during its residence period in the hollow heating vessel 110.

The gas outlet 114 is provided with a second-valve 118, the second valve 118 being adapted to be coupled to the fluid inlet 32 of the housing 20, so as to supply heated gas to the housing 20.

In use, the housing 20 is mounted on and/or clamped to the underwater surface which is to be welded. The first seal 30 provides a water-tight seal at the interface between the underwater surface and the lowermost edge 28 of the housing 20.

At this stage, the space defined by the surface, the housing 20 and the flexible member 40 contains water. Water is expelled from the space through the fluid outlet 34 by applying a positive pressure of gas, for example pressurized air, diver's breathing air, nitrogen, argon, carbon dioxide, Ar/He mixture, and other suitable inert gases, through the fluid inlet 32 to effect a "dry area". It is envisaged that throughout the duration of welding, the positive pressure of gas will be maintained to ventilate the dry area, enclosed by the housing 20 of smoke and other fumes generated during the welding process.

If water is merely displaced from the housing 20 by gas at ambient temperature, the welding environment tends to remain humid because of residual moisture on the welding surface. Thus, optimum conditions for conducting successful dry welds with desirable elongation of tensile allweld are not readily achieved.

The inventor has found that optimum conditions for conducting successful dry welds with desirable elongation of tensile allweld can be achieved by heating the aforementioned gas to a temperature of between 100–300° C., preferably 130–150° C. with the gas heating means 100 prior to the gas entering the housing 20 of the device 10, as described above. The heated gas assists in the evaporation of residual moisture on the welding surface. In this way, the in situ environment in the vicinity of the underwater surface can be kept substantially dry and free of water, and the welding process can proceed under substantially similar conditions conventionally used in normal dry welding. The mechanical properties of a welded surface formed underwater using the present invention has been recorded to be 23–26% elongation of tensile allweld.

The welding electrode 75 is introduced into the housing 20 by piercing the second seal 50 with the welding electrode 75, and then feeding the welding electrode 75 through the flexible tube portion 46 and the aperture 42 in the uppermost wall 25 of the housing 20. The welding electrode 75 is held in a desired position and manipulated with an electrode holder. The flexible nature of the flexible tube portion 46 allows an operator to move and manipulate the welding electrode 75 within the housing 20. The transparent character of the housing 20 allows the operator to view the welding process as it proceeds.

When the operator has completed a weld run, the housing 20 can be removed from the underwater surface and repositioned to allow the next weld run to be completed. After the weld run is fully completed the housing 20 can be repositioned on the next weld joint.

It is envisaged that the device 10 will be suitable for a wide variety of welding processes and applications required for underwater surfaces including manual metal-arc welding, gas-metal arc welding, and flux core welding performed on off-shore structures, oil rigs and platforms, hull section repair, pipeline etc.

The purpose of the present invention is to provide an efficient and cost-effective means by which wet underwater surfaces may be welded underwater under "dry" conditions.

It is also envisaged that the present invention will be particularly suitable for use in a dry environment where it is desirable to isolate a welding area in a confined area to prevent dispersion of sparks in a toxic/explosive/flammable environment. The present invention is also suitable for use in a hyperbaric environment where it is desirable to create a good welding environment which is not hydrogen rich and has low humidity. Modifications and variations as would be apparent to a skilled addressee are deemed to be within the scope of the present invention.

What is claimed is:

1. A device for isolating a surface for welding, comprising a housing provided with:
    a sealed inlet for receiving a welding apparatus, wherein the sealed inlet is disposed in a flexible member to allow the welding apparatus to be manipulated within the housing;
    a fluid inlet for the passage of heated gas into the housing, and a fluid outlet for the passage of heated gas and/or liquid out of the housing;
    a transparent viewing portion;
    a sealing means disposed between the housing and the surface, on which the housing is arranged in use to be mounted to provide a seal between the housing and the surface; and
    a heating means to provide heated gas to the fluid inlet;
    wherein, in use, ingress of the heated gas through the fluid inlet in the housing dries and heats the surface and a space defined by the housing and the surface, and facilitates an egress of gas and/or liquid contained in the space through the fluid outlet in the housing.

2. The device according to claim 1, wherein the heating means comprises a vessel having at least one gas inlet, a gas outlet, and at least one heating element.

3. The device according to claim 2, wherein the heating element is mounted on an inner surface of the vessel.

4. The device according to claim 2 wherein the or each heating element is disposed substantially orthogonally to the direction of gas flow into the heating vessel.

5. The device according to claim 2, wherein the or each heating element heats an interior of the vessel up to and around 700° C.

6. The device according claim 2, wherein the vessel is formed from a rigid material which can withstand a degree of water pressure occurring at a depth where underwater welding is undertaken.

7. The device according to claim 6, wherein the rigid material is an efficient heat conductor.

8. The device according to claim 6, wherein the vessel is formed from a metallic material selected from a group comprising stainless steel, carbon steel, aluminum, titanium, metallic alloys.

9. The device according to claim 2, wherein the vessel is provided with an insulation layer disposed contiguously on an outer surface of the vessel.

10. The device according to claim 9, wherein the insulation layer is formed from a synthetic plastics material.

11. The device according to claim 2, wherein the or each heating element is provided with a conduit for the supply of power to the or each respective heating element from a power source.

12. The device according to claim 2, wherein the gas inlet is provided with a first valve, the first valve being adapted to be coupled to a welding gas source, so as to receive gas into the vessel.

13. The device according to claim 2, wherein the gas outlet is provided with a second valve, the second valve being adapted to be coupled to the fluid inlet of the housing, so as to supply heated gas to the housing.

14. The device according to claim 2, wherein the or each heating element is arranged to heat gas received in the vessel to 100–300° C. during a residence period of the gas in the vessel.

15. The device according to claim 14, wherein the gas is heated to 130–150° C. during the residence period in the vessel.

16. The device according to claim 1, wherein the fluid inlet and the fluid outlet are disposed in opposing walls of the housing.

17. The device according to claim 1, wherein a portion of the fluid inlet extends into the housing.

18. The device according to claim 1, wherein there is more than one fluid inlet disposed in the housing.

19. A device according to claim 1, wherein the fluid inlet is adapted to be coupled with, and in fluid communication with the heating means.

20. The device, according to claim 1, wherein the sealing means depends from, and along the whole extent of, a lowermost edge of the housing.

21. The device according to claim 1, wherein the sealing means is formed from a resilient plastics material.

22. The device according to claim 1, wherein the sealing means is formed from a material wherein the seal formed between the housing and the surface is water-tight.

23. The device according to claim 1, wherein the lowermost edge of the housing is provided with a contour to substantially correspond with an exterior contour of the surface.

24. The device according to claim 1, wherein the housing is formed from a transparent rigid plastics material.

25. The device according to claim 1, wherein the housing is formed from stainless steel with polycarbonate viewing windows.

26. The device according to claim 1, wherein the housing is provided with a flexible member, wherein the sealed inlet is disposed in the flexible member.

27. The device according to claim 1, wherein the welding apparatus received in the housing is a consumable electrode and the sealed inlet is sealed by a resilient material that is punctured by the welding electrode.

28. A device for isolating a surface for welding, comprising a housing provided with:
    a sealed inlet for receiving a welding apparatus, wherein the sealed inlet is disposed in a flexible member to allow the welding apparatus to be manipulated within the housing;
    a fluid inlet for the passage of heated gas into the housing, and a fluid outlet for the passage of heated gas and/or liquid out of the housing;
    a transparent viewing portion; and
    a sealing means disposed between the housing and the surface, on which the housing is arranged in use to be mounted to provide a seal between the housing and the surface;
    wherein, in use, ingress of the heated gas through the fluid inlet in the housing dries and heats the surface and a space defined by the housing and the surface, and facilitates an egress of gas and/or liquid contained in the space through the fluid outlet in the housing;
    wherein a portion of the fluid inlet extends into the housing, and wherein the portion is perforated, forked, or branched.

* * * * *